United States Patent
Hadders et al.

(10) Patent No.: US 7,194,653 B1
(45) Date of Patent: Mar. 20, 2007

(54) NETWORK ROUTER FAILOVER MECHANISM

(75) Inventors: Dennis Hadders, Maple Grove, MN (US); Stephen P. De Groote, Maple Grove, MN (US); Mark A. Bakke, Maple Grove, MN (US)

(73) Assignee: Cisco Technology, Inc., San Jose, CA (US)

( * ) Notice: Subject to any disclaimer, the term of this patent is extended or adjusted under 35 U.S.C. 154(b) by 600 days.

(21) Appl. No.: 10/287,386

(22) Filed: Nov. 4, 2002

(51) Int. Cl.
*G06F 11/00* (2006.01)
(52) U.S. Cl. ............................ 714/4; 370/219; 709/239
(58) Field of Classification Search .................... 714/4; 709/239; 398/19; 370/219
See application file for complete search history.

(56) References Cited

U.S. PATENT DOCUMENTS

| | | | | |
|---|---|---|---|---|
| 5,473,599 A | * | 12/1995 | Li et al. | 370/219 |
| 5,754,752 A | * | 5/1998 | Sheh et al. | 714/4 |
| 5,812,751 A | * | 9/1998 | Ekrot et al. | 714/4 |
| 5,845,061 A | * | 12/1998 | Miyamoto et al. | 714/4 |
| 6,145,089 A | * | 11/2000 | Le et al. | 714/4 |
| 6,148,410 A | * | 11/2000 | Baskey et al. | 714/4 |
| 6,292,905 B1 | * | 9/2001 | Wallach et al. | 714/4 |
| 6,526,521 B1 | * | 2/2003 | Lim | 714/4 |
| 6,574,753 B1 | * | 6/2003 | Haynes et al. | 714/43 |
| 6,757,836 B1 | * | 6/2004 | Kumar et al. | 714/4 |
| 6,920,580 B1 | * | 7/2005 | Cramer et al. | 714/4 |
| 2003/0233473 A1 | * | 12/2003 | Bonhomme et al. | 709/238 |

OTHER PUBLICATIONS

EMC Corporation, PowerPath Version 3.0 Product Guide P/N 300-000-510 REV A01, Jun. 2002, EMC Corporation, pp. 3-3 and 3-6.*

* cited by examiner

*Primary Examiner*—Scott Baderman
*Assistant Examiner*—Paul Contino
(74) *Attorney, Agent, or Firm*—Schwegman, Lundberg, Woessner & Kluth P.A.

(57) ABSTRACT

A method, system, apparatus, and signal-bearing media for determining connectivity information for routers running on servers that are attached to a device. A router is resigned in favor of a corresponding router at another server when the corresponding router has better connectivity to the device, where partial connectivity is better than no connectivity, and full connectivity is better than partial connectivity.

62 Claims, 5 Drawing Sheets

NETWORK ROUTER FAILOVER MECHANISM

FIELD OF THE INVENTION

This invention relates generally to networks of computers and more particularly to accessing a device at a remote computer via a network.

BACKGROUND OF THE INVENTION

Computer systems need a way to store and retrieve data from a variety of data devices, such as disk drives, printers, display screens, and scanners. In the past, each computer typically had its own directly-attached devices, which no other computer was capable of using. But, this was a cumbersome and expensive design because sharing data among computers was difficult and a particular device might stay idle and unused for lengthy periods. For example, a retail store might have multiple cash registers, but each cash register storing its own price/product data locally is less efficient and more cumbersome than every cash register accessing the same price/product data on one device, such as a disk drive.

In order to overcome the aforementioned cumbersome and expensive solutions, computers are connected in networks, and one computer (often called a client or a host) is allowed to store and retrieve data from another computer's (often called a server) devices. Many clients have a need for their data to always be available. For example, a retail store open twenty-four hours a day always needs its price/product data available. In order to ensure high availability of the data, some networks have built-in redundancy with multiple paths or connections through multiple servers to the device, so that if one path fails, the device may be still accessible through another path. But, these networks suffer from the problem that when one path to the device fails, the alternative path selected may be no better than the failing path. Since is takes time to switch from one path to another, if the alternative path is no better, performance suffers with no increase in data availability. Thus, there is a need for a technique that can better determine when to switch between paths.

SUMMARY OF THE INVENTION

The present invention provides solutions to the above-described shortcomings in conventional approaches, as well as other advantages apparent from the description below. A method, apparatus, system, and a signal-bearing medium are provided for determining connectivity information for routers running on servers that are attached to a device. A router is resigned in favor of a corresponding router at another server when the corresponding router has better connectivity to the device, where partial connectivity is better than no connectivity, and full connectivity is better than partial connectivity.

DETAILED DESCRIPTION OF THE INVENTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

Figure 1:
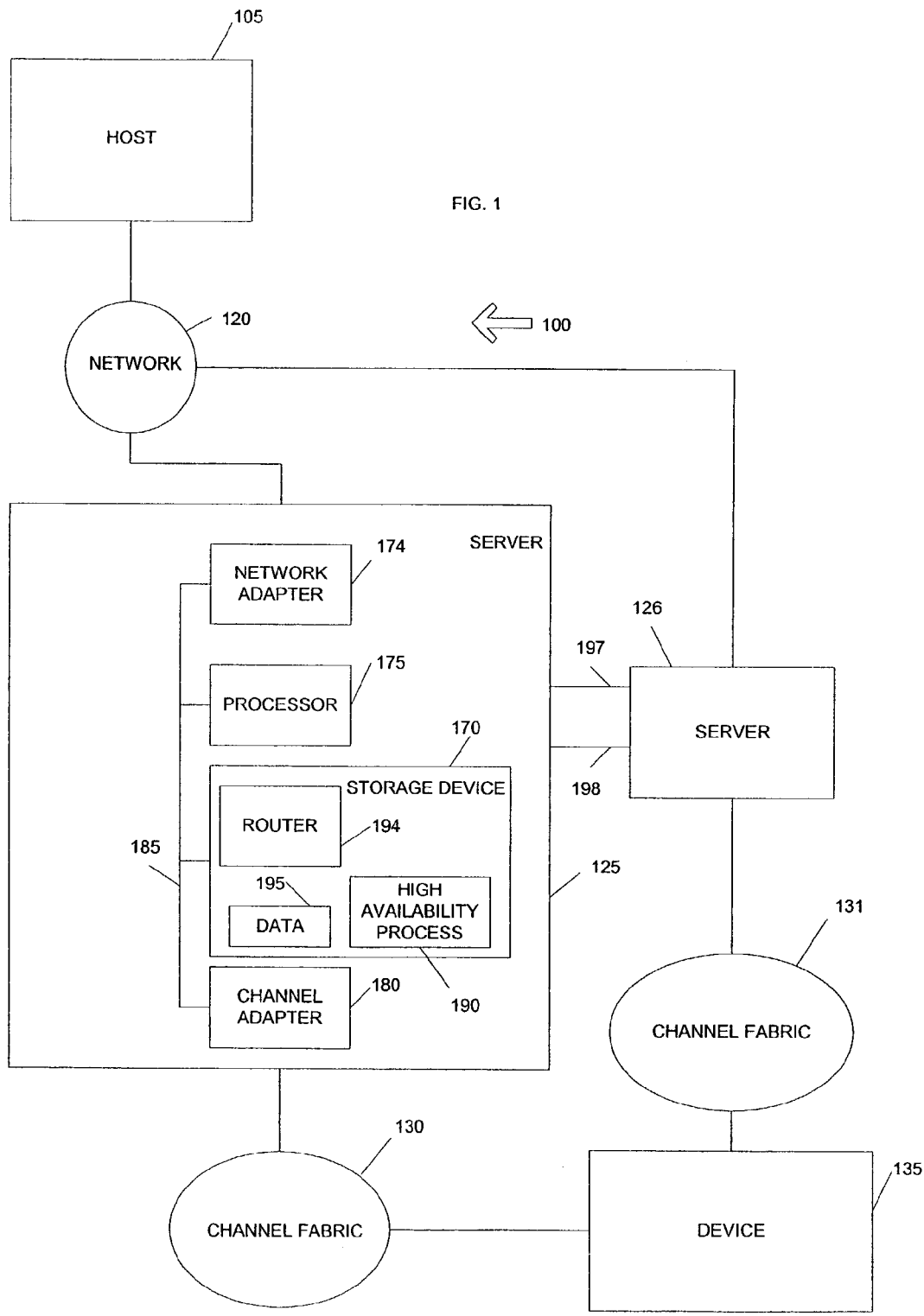
FIG. 1 depicts a pictorial example of a network of computer systems and devices that may be used to implement an embodiment of the invention.

FIG. 1 depicts an example system 100, including a network of computer systems and devices that may be used to implement an embodiment of the invention. A host 105 is communicatively coupled to a network 120. The network 120 is communicatively coupled to a server computer 125, which is communicatively coupled to a channel fabric 130, which is communicatively coupled to a device 135. The network 120 is further communicatively coupled to a server computer 126, which is communicatively coupled to a channel fabric 131, which is communicatively coupled to the device 135.

The host 105 may be a computer or other electronic device that wishes to store and/or retrieve data to/from the device 135. Although only one host 105 is shown, in other embodiments any number of hosts may be present.

Networked systems often follow a client/server architecture. In an embodiment, a client is a process (i.e., a program or task) executing on a computer that requests a service provided by another program or computer. In another embodiment, the client is the computer itself. The client utilizes the requested service without needing to know any working details about the other program or the service itself. In networked systems, a client is usually a computer that accesses shared network resources provided by another computer, such as server.

The network 120 may includes many servers and/or many clients, which act to pass information between them. In an embodiment, the network 120 utilizes the TCP/IP protocol. TCP/IP is an acronym for "Transport Control Protocol/Internet Protocol," a protocol developed by the Department of Defense for facilitating communications between computers. In an embodiment, iSCSI protocol commands are sent through the network 120 using TCP/IP. iSCSI is a protocol for sending SCSI (Small Computer System Interface) commands over the Internet. SCSI is a standard high-speed parallel interface defined by the X3T9.2 committee of the American National Standards Institute (ANSI).

The network 120 provides the host 105 with a means of electronically communicating information, including software, with a remote computer or a network logical-storage device. In addition, the network 120 may support distributed processing, which enables the host 105 to share a task with other computer systems linked to the network. The network 120 may include a plurality of networks, each of which could include a plurality of individual computers. The host 105 and the servers 125 and 126 may be connected directly to the network 120 via a standard telephone line, a dedicated cable, or a wireless communications link, or may be connected indirectly to the network 120 via another network or a client and/or another server.

The servers 125 and 126 may be computers remote from the host 105 over the network 120. Based on requests from the host 105 the server 125 and/or the server 126 may store and/or retrieve data to/from the device 135.

The server 125 may include a storage device 170, a network adapter 174, a processor 175, and a channel adapter 180, which are all connected via a system bus 185. The server 125 is capable of communicating across the network 120 using a TCP/IP (Transmission Control Protocol/Internet Protocol) connection, although any suitable communications protocol may be used.

The storage device 170 may be any type of computer memory, volatile or non-volatile. In an embodiment, the storage device 170 may be one or more hard disk drives. In another embodiment, the storage device 170 may be ROM (read only memory), a tape drive, a diskette drive, a CD-ROM drive, or any device or combination of devices capable of storing instructions and data. Although the storage device 170 is shown incorporated into the server 125, in other embodiments, it may be external to the server 125, either connected directly, on a local area network (LAN), or on the network 120.

The storage device 170 may include a high-availability process 190, which contains instructions capable of being executed by the processor 175. In another embodiment, the high-availability process 190 may be implemented by control circuitry though the use of logic gates, programmable logic devices, or other hardware components in lieu of a processor-based system. Although the high-availability process 190 is shown contained within the storage device 170, in another embodiment, the high-availability process 190 may be part of the channel adapter 180. Operations of the high-availability process 190 are further described below with reference to FIGS. 2, 3, 4, and 5.

The storage device may further include a router 194. Although only one router 194 is shown, multiple router instances may exist, each with its own network address, e.g., its own IP address on the network 120. A router instance may either be a running instance or a ghost instance. A running router instance processes commands between the network adapter 174 and the channel adapter 180. A ghost instance of a router exists to determine the connectivity of its associated targets, LUNs (Logical Unit Numbers), and network connections. A ghost router instance may start running if its corresponding router running on another server resigns. The operations of the router 194 are further described below with reference to FIGS. 2, 3, 4 and 5.

The storage device may further include data 195, which may include data structures representing the device 135 and the status of connections to the device, as further described below with reference to FIG. 2.

The processor 175 may be any type of computer processor. The processor 175 accesses data and instructions from and stores data to the storage device 170. The processor 175 executes instructions and includes that portion of the server 125 that controls the operation of the entire computer system, including executing the arithmetical and logical functions contained in a particular computer program. The processor 175 organizes data and program storage in the storage device 170 and transfers data and other information between the various part of the computer system. The processor 174 accesses data and instructions from and stores data to the storage device 170. Although the server 125 is shown to contain only a single processor and a single system bus, the present invention applies equally to computer systems that have multiple processors and to computer systems that have multiple buses that each perform different functions in different ways.

The server 125 may be implemented using any suitable computer such as a Cisco SN5420 Universal Access Server or the Cisco SN5428 Universal Access Server. Portable computers, laptop computers, and network computers or Internet appliances are other possible configurations. The hardware depicted in FIG. 1 may vary for specific applications. For example, other peripheral devices such as optical-disk media, audio adapters, or chip programming devices, such as PAL or EPROM programming devices may be used in addition to or in place of the hardware already depicted. Thus, an embodiment of the invention may apply to any hardware configuration that allows attachment of devices, regardless of whether the hardware configuration is a complicated, multi-user computing apparatus, a single-user workstation, or a network appliance that does not have non-volatile storage of its own.

The server 126 may include components analogous to those already described for the server 125. The servers 125 and 126 may be communicatively coupled via two connections, a management connection 197 and a high-availability connection 198. "Management" and "high-availability" are merely names associated with the connections 197 and 198 in an embodiment, and connections with any names may be used in other embodiments.

The channel fabrics 130 and 131 may transfer data between the servers 125 and 126, respectively and the device 135. In an embodiment, the channel fabrics 130 and 131 may be implemented using the Fibre Channel I/O (Input/Output) protocol. Fibre Channel is an asynchronous, serial I/O protocol that is unaware of the content or meaning of the information being transferred. In other embodiments, any suitable I/O protocol may be used, such as the SCSI (Small Computer System Interface) or IDE (Integrated Device Electronics) protocols. Although the channel fabrics 130 and 131 are shown as being separate from their respective servers 125 and 126, in another embodiment the channel fabric 130 may be packaged as part of the server 125 and/or the channel fabric 131 may be packaged as part of the server 126.

The device 135 may be any I/O (input/output) device, such as a workstation, hard disk drive, disk array, diskette drive, CD-ROM drive, DVD (Digital Video Disc) drive, tape drive, scanner, medical instrument, or any other device capable of receiving and/or sending data. Although only one device 135 is shown, in another embodiment multiple devices may be present. Further, the device 135 may include multiple, separately addressable logical units. For example, one device may include an array of separately addressable disk drives or multiple tape drives.

In an embodiment of the system 100, a user or software application at the host 105 may issue a command to store or retrieve data on the device 135. The request is converted into one or more SCSI commands and/or data and encapsulated by representing them as a serial string of bytes proceeded by iSCSI headers. The encapsulated data is broken up into packets suitable for transfer over the network according to the TCP/IP protocol and sent over the network 120. The server 125 (e.g., an instance of the router 194) or the server 126 recombines the packets into the original encapsulated SCSI commands and data. The server 125 or 126 then converts the SCSI commands and data into Fibre Channel commands and sends them across the channel fabric 130 or 131 to the device 135, which performs the functions that were originally requested by the host 105.

Although the system 100 has been described in the context of TCP/IP, Fibre Channel, and iSCSI, any suitable protocols may be used. For example, in another embodiment, SCSI or IDE may be used instead of Fibre Channel for one or both of the interfaces between the host 105, the servers 125 or 126, and the device 135.

Although the various components of FIG. 1 are drawn as single entities, each may consist of multiple entities and may exist at multiple levels.

As will be described in detail below, aspects of an embodiment pertain to specific method steps implementable on computers. In another embodiment, the invention may be implemented as a computer program product for use with a computer system. The programs defining the functions of the embodiment may be delivered to a computer via a variety of signal-bearing media, which include, but are not limited to:

(1) information permanently stored on a non-rewriteable storage medium (e.g., a read only memory device within a computer such as a CD-ROM disk) readable by a CD-ROM drive;

(2) alterable information stored on a writeable storage medium (e.g., a hard disk drive or diskette); or (3) information conveyed to a computer by a communications medium, such as through a computer or telephone network including wireless communications.

Such signal-bearing media, when carrying computer-readable instructions that direct the functions of the present invention, represent embodiments of the present invention.

Figure 2:
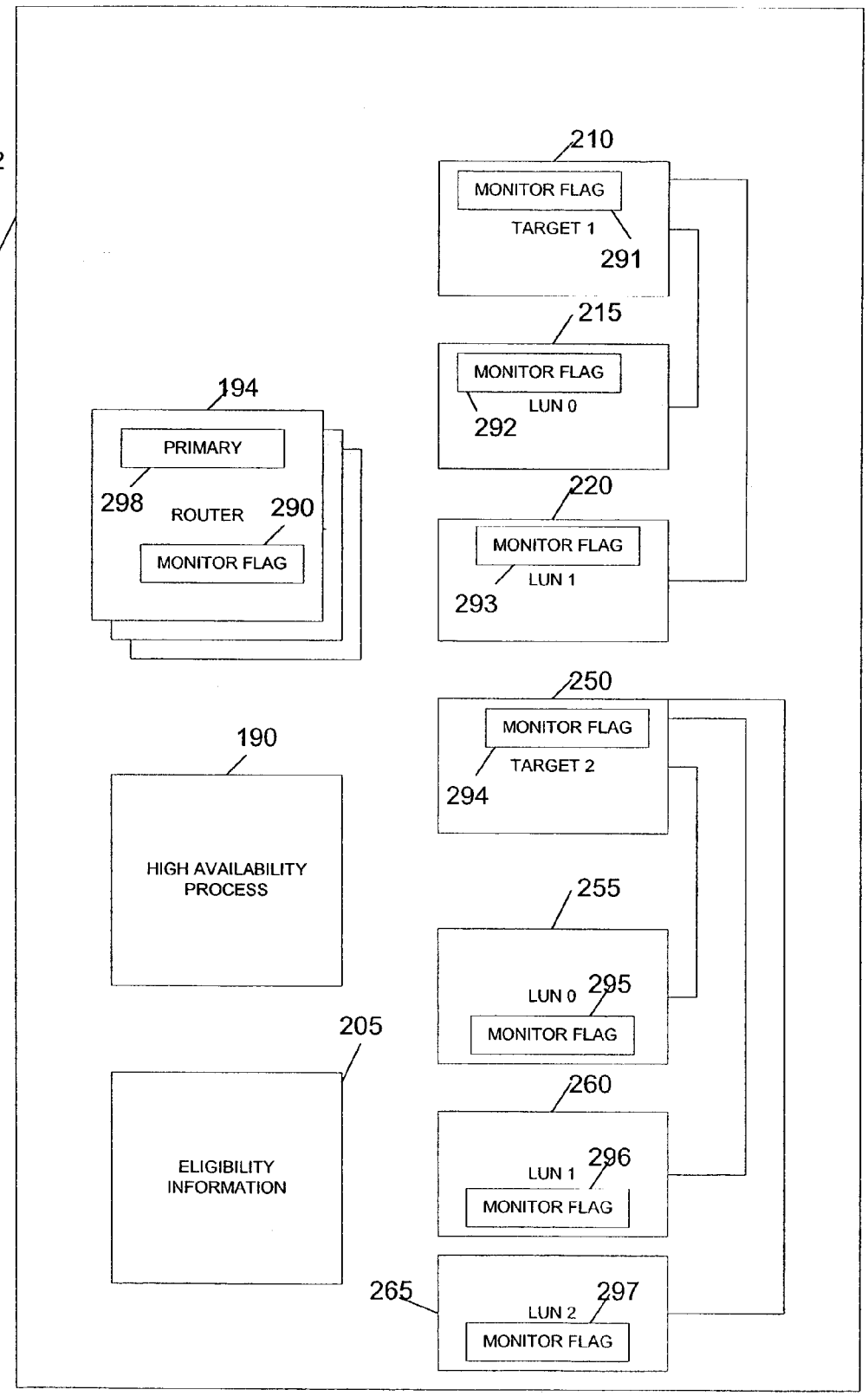
FIG. 2 depicts a block diagram of detail of data and code in a storage device.

FIG. 2 depicts a block diagram of detail of data and code in the storage device 170, which may be used to implement an embodiment of the invention. The storage device 170 may include the high-availability process 190, router instances 194, eligibility information 205, targets 210 and 250, and LUNs 215, 220, 255, 260, and 265. The high-availability process 190 is further described below with reference to FIGS. 3, 4, and 5. The router 194 may have multiple instances, each having a monitor flag 290. A router instance may either be a running instance or a ghost instance. A ghost instance of a router exists to determine the connectivity of its associated targets, LUNs, and network connection, as further described below with reference to FIGS. 3, 4, and 5.

Each instance of the router 194 also contains a primary attribute 298. The use of the primary attribute 298 is optional. The primary attribute 298, is used, specifies a server (e.g., 125 or 126) in the system 100 as the primary server for a specified router instance. The high-availability process 190 attempts at all times to run the router instance on the primary server. When the router instance is not running on the primary server, the high-availability process 190 continually checks the eligibility of the corresponding server designated as the primary. When the eligibility of the primary server is full connectivity again, the high-availability process 190 resigns the current running router instance and requests the primary server to run the router instance. The details concerning the primary router attribute are further described below with reference to FIG. 4.

The targets 210 and 250 may be data structures that represent attached devices, such as the device 135. The target 210 may have a monitor flag 291, and the target 250 may have a monitor flag 294.

Associated with the target 210 are LUNs (logical unit numbers) 215 and 220, which are data structures that represent separately addressable logical units within the device associated with the target 210. The LUN 215 may have a monitor flag 292, and the LUN 220 may have a monitor flag 293.

Associated with the target 250 are LUNs 255, 260, and 265, which are data structures that represent separately addressable logical units within the device associated with the target 250. The LUN 255, the LUN 260, and the LUN 265 may have respective monitor flags 295, 296, and 297.

Although two targets 210 and 250 are shown, any number may be present. Although two LUNs 215 and 220 are shown associated with the target 210 and three LUNs 255, 260, and 265 are shown associated with the target 250, any number may be present.

When an instance of the router 194 is created, its monitor flag 290 is cleared. When an instance of the router 194 is started from a saved configuration (e.g., at powerup), its monitor flag 290 is set. When a target (210 or 250) or LUN (215, 220, 255, 260, or 265) data structure is created, its monitor flag (291, 292, 293, 294, 295, 296, or 297, respectively) is cleared. When a target device 135 is discovered that is used by a target or LUN data structure, the monitor flag in the data structure is set. Whenever a monitor flag in a target or LUN data structure is set, the monitor flag is also set for the router instance to which the data structure belongs, which means if a router instance is configured with no mappings, its monitor flag is never set. The use of monitor flags keeps an instance of the router 194 from being considered for possible resignation until at least one of its configured devices is discovered, meaning that connectivity has occurred. The processing of monitor flags is further described below with reference to FIG. 5. Once connectivity has occurred, the router instance is considered to be in use and thus eligible for resignation. Resignation is further described below with respect to FIG. 4. A router without any associated target or LUN data structures is not considered to be in use.

Figure 3:
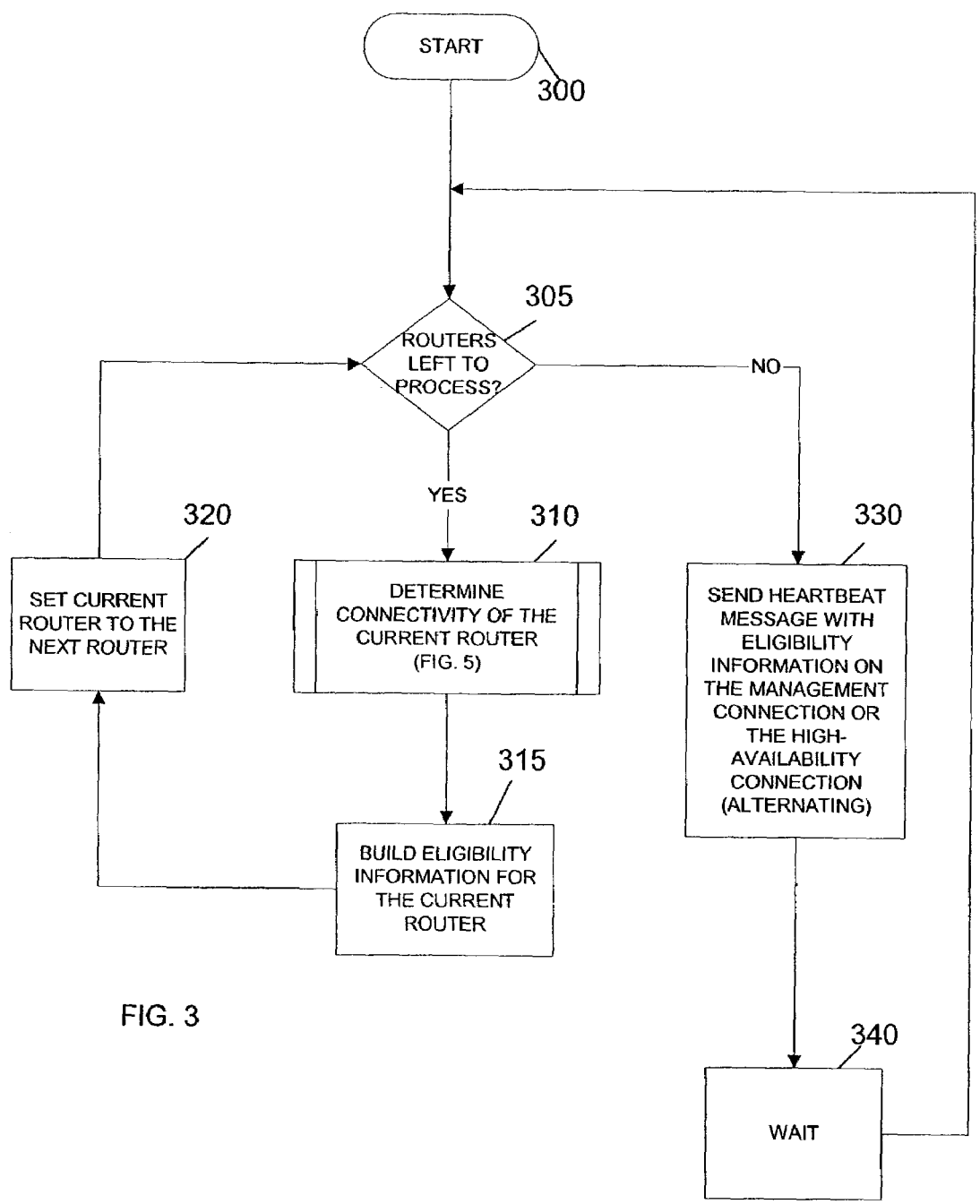
FIG. 3 depicts a flowchart that describes the operation of a high-availability send heartbeat function, according to an embodiment of the invention.

FIG. 3 depicts a flowchart that describes the operation of a high availability send heartbeat function, according to an embodiment of the invention. Although FIG. 3 is described in terms of operations that occur at the server 125, the operations may also occur at another server, such as the server 126. Control begins at block 300. Control then continues to block 305 where the high-availability process 190 determines whether there are router instances (both running and ghost) left to process.

If the determination at block 305 is true, then control continues to block 310 where the high-availability process 190 calls a function associated with the current router instance to determine the connectivity of the current router instance, as further described below with reference to FIG. 5. Control then continues to block 315 where the high-availability process 190 adds the connectivity information for the current router instance returned at block 310 into the eligibility information 205 for the current router. Control then continues to block 320 where the high-availability process 190 sets the current router to be the next router. Control then returns to block 305 as previously described above.

If the determination at block 305 is false, then all of the routers have been processed, so control continues to block 330 where the high-availability process 190 sends a heartbeat message with the eligibility information 205 for all routers on either the management connection 197 or the high-availability connection 198 to another server, e.g., the server 126. The high-availability process 190 alternates sending the messages between the two connections 197 and 198. Control then continues to block 340 where the high-availability process 190 waits for a period of time. Control then returns to block 305 as previously described above.

Figure 4:
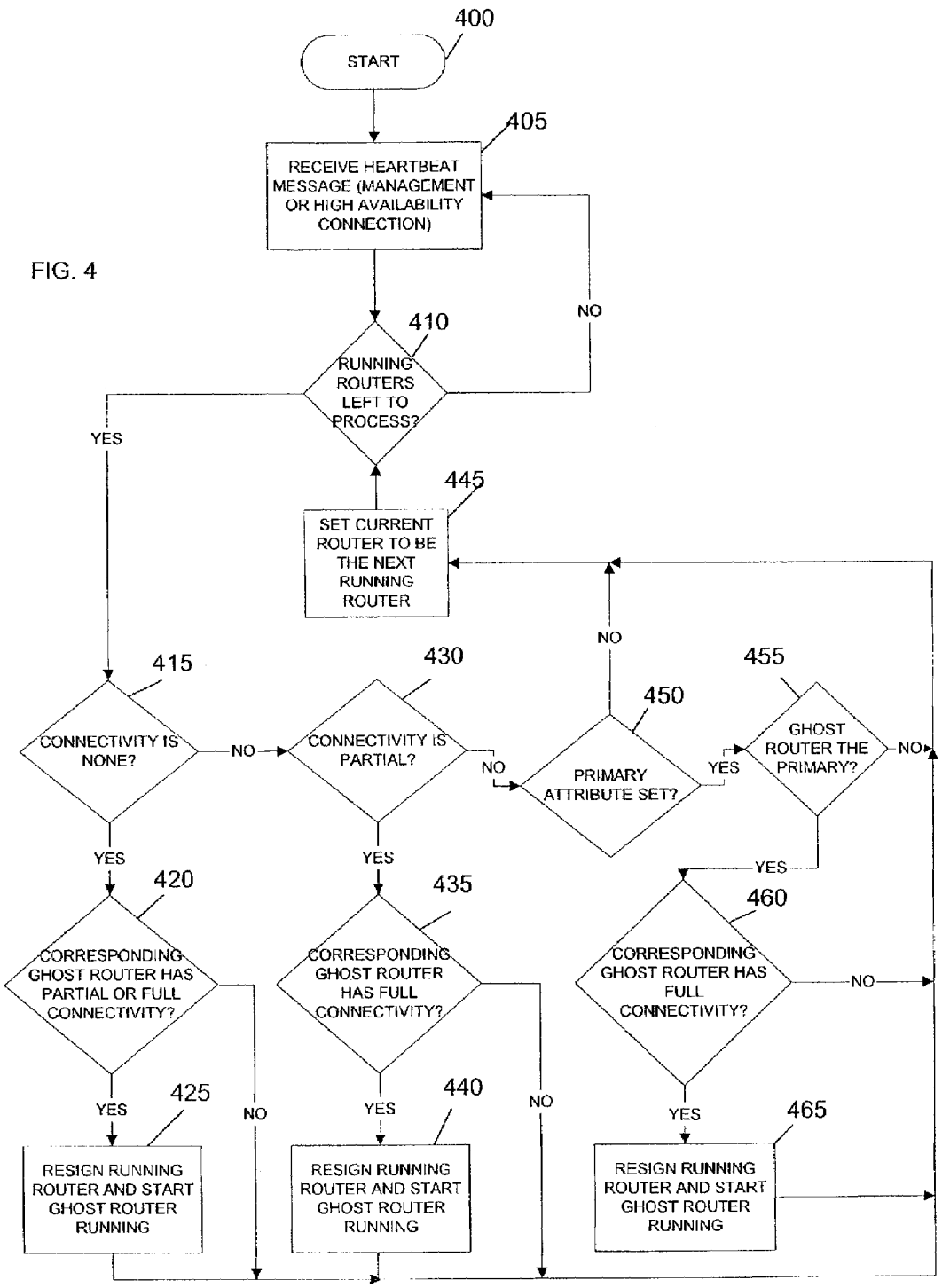
FIG. 4 depicts a flowchart that describes the operation of a high-availability receive heartbeat function, according to an embodiment of the invention.

FIG. 4 depicts a flowchart that describes the operation of a high-availability receive heartbeat function, according to an embodiment of the invention. Although FIG. 4 is described in terms of operations that occur at the server 125, the operations may also occur at another server, such as the server 126. Control begins at block 400. Control then continues to block 405 where the high-availability process 190 receives a heartbeat message from the server 126 containing eligibility information regarding routers at the server 126 on either the management connection 197 or the high-availability connection 198. Control then continues to block 410 where the high-availability process 190 determines whether there are router instances running on the server 125 left to process.

If the determination at block 410 is true, then control continues to block 415 where the high-availability process 190 determines whether the eligibility information (previously built at block 315 in FIG. 3) indicates that the current router instance has no connectivity. If the determination at block 415 is true, then control continues to block 420 where the high-availability process 190 determines whether the corresponding ghost router on the server 126 has partial or full connectivity (better connectivity than the current running router on the server 125), as indicated in the availability information received at block 405. If the determination at block 420 is true, then control continues to block 425 where the high-availability process 190 resigns the current running router and requests the server 126 with the ghost router to start the ghost router running in place of the current running router. Control then continues to block 445 where the high-availability process 190 sets the current router to be the next running router on the server 125. Control then returns to block 410, as previously described above.

If the determination at block 420 is false, then control continues to block 445, as previously described above.

If the determination at block 415 is false, then control continues to block 430 where the high-availability process 190 determines whether the eligibility information (previously built at block 315 in FIG. 3) indicates that the current router instance has partial connectivity. If the determination at block 430 is true, then control continues to block 435 where the high-availability process 190 determines whether the corresponding ghost router on the server 126 has full connectivity (better connectivity than the current running router on the server 125), as indicated in the availability information received at block 405. If the determination at block 435 is true, then control continues to block 440 where the high-availability process 190 resigns the current running router and requests the server 126 with the ghost router to start the ghost router running in place of the current running router. Control then continues to block 445, as previously described above.

If the determination at block 435 is false, then control continues to block 445, as previously described above.

If the determination at block 430 is false, then control continues to block 450 where the primary attribute of the current router is checked. If a primary attribute is not set, control continues to block 445 as previously described above. If a primary attribute is set, then control continues to block 455 where a determination is made whether the corresponding ghost router is the primary. If the determination at block 455 is false, then control continues to block 445 as previously described above.

If the determination at block 455 is true, then control continues to block 460 where a determination is made whether the corresponding ghost router has full connectivity. If the determination at block 460 is false, then control continues to block 445 as previously described above.

If the determination at block 460 is true, then control continues to block 465 where the running router is resigned and a new ghost router is started running. Control then continues to block 445 as previously described above.

If the determination at block 410 is false, then control returns to block 405, as previously described above.

Figure 5:
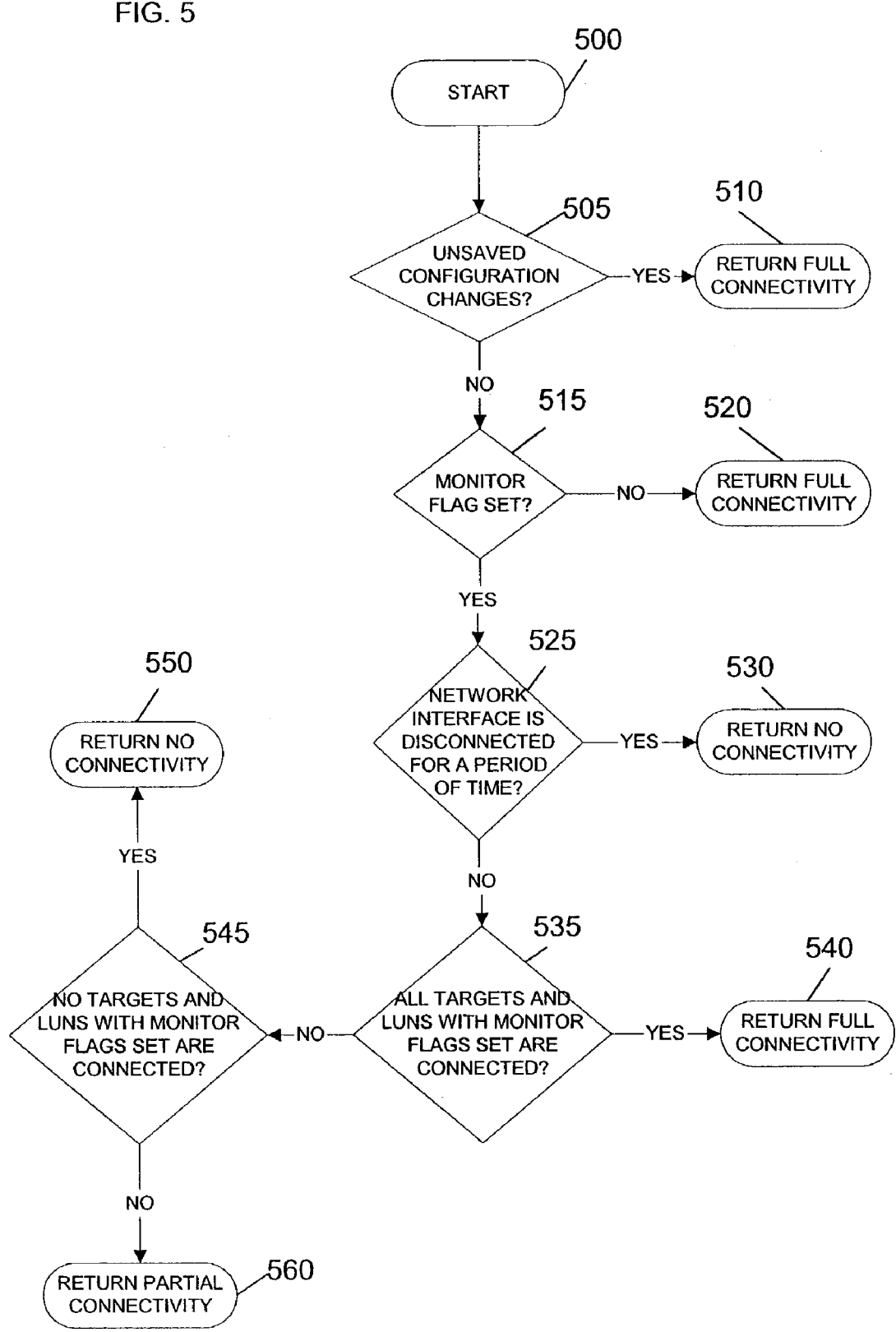
FIG. 5 depicts a flowchart that describes the operation of a connectivity function, according to an embodiment of the invention.

FIG. 5 depicts a flowchart that describes the operation of a connectivity function, according to an embodiment of the invention. Although FIG. 5 is described in terms of operations that occur at the server 125, the operations may also occur at another server, such as the server 126. Control begins at block 500. Control then continues to block 505 where the high availability process 190 determines whether there are unsaved configuration changes. If the determination at block 505 is true, then control continues to block 510 where the function returns that connectivity is full. The purpose of blocks 505 and 510 is to keep the router instance from resigning while it is being configured, in order to keep the router instance in a known state.

If the determination at block 505 is false, then control then continues to block 515 where the high availability process 190 determines whether the monitor flag for the router instance is set. If the determination at block 515 is false, then control continues to block 520 where the function returns that connectivity is full.

If the determination at block 515 is true, then control then continues to block 525 where the high availability process 190 determines whether the network interface (the interface to the network 120 through the network adapter 174) has been disconnected for a period of time. If the determination at block 525 is true, then control continues to block 530 where the function returns that connectivity is none.

If the determination at block 525 is false, then control then continues to block 535 where the high availability process 190 determines whether all targets and LUNs associated with the router instance that have monitor flags set are connected. The high availability process 190 may make the determination of block 535 by querying the channel fabric 130 for status of the targets and LUNs associated with the device 135. If the determination at block 515 is true, then control continues to block 540 where the function returns that connectivity is full.

If the determination at block 535 is false, then control then continues to block 545 where the high availability process 190 determines whether no targets and LUNs associated with the router instance that have monitor flags set are connected. The high availability process 190 may make the determination of block 545 by querying the channel fabric 130 for status of the targets and LUNs associated with the device 135. If the determination at block 545 is true, then control continues to block 550 where the function returns that connectivity is none.

If the determination at block 545 is false, then control continues to block 560 where the function returns that connectivity is partial.

What is claimed is:

1. A method of transferring data between a host and a device, the method comprising:
 connecting a first server to the host across a network and to the device across a first channel fabric;

connecting a second server to the host across the network and to the device across a second channel fabric;

communicatively coupling the first server with the second server;

establishing multiple instances of a router on each server;

designating the at least one of the routers on the first server as running and at least one of the corresponding routers on the second server as ghost;

determining first connectivity information regarding connectivity across the first channel fabric between the device and the running router;

receiving second connectivity information describing connectivity across the second channel fabric between the device and the ghost router;

comparing at both the first and second server the first and second connectivity information; and resigning the running router operating on the first server in favor of the ghost router operating on the second server when the comparison indicates that the ghost router has better connectivity, wherein resigning includes designating the router operating on the second server as running and the router operating on the first server as ghost.

2. The method of claim 1, wherein the second connectivity information indicates a better connection to the device than the first connectivity information when the second connectivity information indicates the partial connection to the device and the first connectivity information indicates no connection to the device.

3. The method of claim 1, wherein the second connectivity information indicates a better connection to the device than the first connectivity information when the second connectivity information indicates a full connection to the device and the first connectivity information indicates the partial connection to the device.

4. The method of claim 1, wherein the determining further comprises:

determining that the running router has a full connection when the running router has unsaved configuration changes.

5. The method of claim 1, wherein the determining further comprises:

determining that the running router has no connection when a network interface is disconnected for a period of time.

6. The method of claim 1, wherein the determining further comprises:

determining that the running router has no connection when no targets and logical units associated with the running router are connected.

7. The method of claim 1, wherein the determining further comprises:

determining that the running router has a full connection when all targets and logical units associated with the running router are connected.

8. The method of claim 1, wherein the determining further comprises:

determining that the running router has the partial connection when less than all targets and logical units associated with the running router are connected.

9. The method of claim 1, wherein the determining further comprises:

determining that the running router has a full connection before the running router has discovered the device.

10. The method of claim 1, wherein sending the connectivity information includes:

connecting the first server to the second server via a management connection and a high-availability connection; and transferring the connectivity information alternatively across the management connection and a high-availability connection.

11. The method of claim 1, wherein determining connectivity information includes establishing a high-availability process, wherein the high-availability process, when running, determines connectivity to its associated targets, LUNs and network connections.

12. The method of claim 1, wherein the ghost router and running router monitor connectivity to a set of resources, wherein the set of resources is the same set of resources for each router.

13. The method of claim 12, wherein the set of resources includes targets, LUNs (Logical Unit Numbers), and network connections.

14. The method of claim 1, wherein one of the routers is designated as primary; and wherein, if the primary router is the ghost router and the comparison determines that the ghost router has connectivity at least equal to the running router, then the running router will resign promoting the ghost router to the running router.

15. An apparatus comprising:

a network connection for receiving data from a host to be transferred to a device;

a channel fabric connection;

establishing multiple instances of a router on a first and second server;

at least one running router operating on the first server;

at least one ghost router corresponding to the running router operating on the second server;

means for determining first connectivity information describing connectivity to the device across the channel fabric connection for the running router;

means for receiving second connectivity information describing connectivity to the device across a second channel fabric connection for the ghost;

means for communicatively coupling the first server and the second server;

means for comparing at both the first and second server the first and second connectivity information; and means for resigning the running router in favor of the ghost router when the comparison indicates that the ghost router has better connectivity, wherein resigning includes designating the router operating on the second server as running and the router operating on the first server as ghost.

16. The apparatus of claim 15, wherein the second connectivity information indicates a better connection to the device than the first connectivity information when the second connectivity information indicates the partial connection to the device and the first connectivity information indicates no connection to the device.

17. The apparatus of claim 15, wherein the second connectivity information indicates a better connection to the device than the first connectivity information when the second connectivity information indicates a full connection to the device and the first connectivity information indicates the partial connection to the device.

18. The apparatus of claim 15, wherein the means for determining further comprises:
    means for determining that the running router has a full connection when the running router has unsaved configuration changes.

19. The apparatus of claim 15, wherein the means for determining further comprises:
    means for determining that the running router has no connection when a network interface is disconnected for a period of time.

20. The apparatus of claim 15, wherein the means for determining further comprises:
    means for determining that the running router has no connection when no targets and logical units associated with the running router are connected.

21. The apparatus of claim 15, wherein the means for determining further comprises:
    means for determining that the running router has a full connection when all targets and logical units associated with the running router are connected.

22. The apparatus of claim 15, wherein the means for determining further comprises:
    means for determining that the running router has the partial connection when less than all targets and logical units associated with the running router are connected.

23. The apparatus of claim 15, wherein the means for determining further comprises:
    means for determining that the running router has a full connection before the running router has discovered the device.

24. The apparatus of claim 15, wherein the means for sending the connectivity information to the second server includes:
    means for connecting the first server to the second server via a management connection and a high-availability connection; and
    means for transferring the connectivity information alternatively across the management connection and a high-availability connection.

25. The apparatus of claim 15, wherein the means for determining connectivity information includes means for establishing a high-availability process, wherein the high-availability process, when running, determines connectivity to its associated targets, LUNs and network connections.

26. The apparatus of claim 15, wherein the ghost router and running router monitor connectivity to a set of resources, wherein the set of resources is the same set of resources for each router.

27. The apparatus of claim 26, wherein the set of resources includes targets, LUNs (Logical Unit Numbers), and network connections.

28. The apparatus of claim 15, wherein one of the routers is designated as primary; and
    wherein, if the primary router is the ghost router and the comparison determines that the ghost router has connectivity at least equal to the running router, then the running router will resign promoting the ghost router to the running router.

29. A computer-readable storage medium encoded with instructions, wherein the instructions when executed comprise:
    connecting a first server to a host across a network and to a device across a first channel fabric;
    connecting a second server to the host across the network and to the device across a second channel fabric;
    connecting the first server with the second server;
    establishing multiple instances of a router on each server;
    designating at least one of the routers on the first server as running and at least one of the routers on the second server as ghost;
    determining first connectivity information regarding connectivity across the first channel fabric between the device and the running router;
    receiving second connectivity information describing connectivity across the second channel fabric between the device and the ghost router;
    comparing at both the first and second server the first and second connectivity information; and
    resigning the running router in favor of the ghost router when the comparison indicates that the ghost router has better connectivity, wherein resigning includes designating the router operating on the second server as running and the router operating on the first server as ghost.

30. The computer-readable storage medium of claim 29, wherein the second connectivity information indicates a better connection to the device than the first connectivity information when the second connectivity information indicates the partial connection to the device and the first connectivity information indicates no connection to the device.

31. The computer-readable storage medium of claim 29, wherein the second connectivity information indicates a better connection to the device than the first connectivity information when the second connectivity information indicates a full connection to the device and the first connectivity information indicates the partial connection to the device.

32. The computer-readable storage medium of claim 29, wherein the determining further comprises:
    determining that the running router has a full connection when the running router has unsaved configuration changes.

33. The computer-readable storage medium of claim 29, wherein the determining further comprises:
    determining that the running router has no connection when a network interface is disconnected for a period of time.

34. The computer-readable storage medium of claim 29, wherein the determining further comprises:
    determining that the running router has no connection when no targets and logical units associated with the running router are connected.

35. The computer-readable storage medium of claim 29, wherein the determining further comprises:
    determining that the running router has a full connection when all targets and logical units associated with the running router are connected.

36. The computer-readable storage medium of claim 29, wherein the determining further comprises:
    determining that the running router has the partial connection when less than all targets and logical units associated with the running router are connected.

37. The computer-readable storage medium of claim 29, wherein the determining further comprises:
    determining that the running router has a full connection before the running router has discovered the device.

38. The computer-readable storage medium of claim 29, wherein the ghost router and running router monitor connectivity to a set of resources, wherein the set of resources is the same set of resources for each router.

39. The computer-readable storage medium of claim 38, wherein the set of resources includes targets, LUNs (Logical Unit Numbers), and network connections.

40. The computer-readable storage medium of claim 29, wherein one of the routers is designated as primary; and
   wherein, if the primary router is the ghost router and the comparison determines that the ghost router has connectivity at least equal to the running router, then the running router will resign promoting the ghost router to the running router.

41. A server comprising:
   a processor; and
   a storage device encoded with instructions, wherein the instructions when executed on the processor comprise:
      connecting a first server to a host across a network and to a device across a first channel fabric;
      connecting a second server to the host across the network and to the device across a second channel fabric;
      connecting the first server with the second server;
      establishing multiple instances of a router on each server;
      designating at least one of the routers on the first server as running and at least one of the routers on the second server as ghost;
      determining first connectivity information regarding connectivity across the first channel fabric between the device and the running router;
      receiving second connectivity information describing connectivity across the second channel fabric between the device and the ghost router;
      comparing at both the first and second server the first and second connectivity information; and
      resigning the running router operating on the first server in favor of the ghost router operating on the second server when the comparison indicates that the ghost router has better connectivity, wherein resigning includes designating the router operating on the second server as running and the router operating on the first server as ghost.

42. The server of claim 41, wherein the second connectivity information indicates a better connection to the device than the first connectivity information when the second connectivity information indicates the partial connection to the device and the first connectivity information indicates no connection to the device.

43. The server of claim 41, wherein the second connectivity information indicates a better connection to the device than the first connectivity information when the second connectivity information indicates a full connection to the device and the first connectivity information indicates the partial connection to the device.

44. The server of claim 41, wherein the determining further comprises:
   determining that the running router has a full connection when the running router has unsaved configuration changes.

45. The server of claim 41, wherein the determining further comprises:
   determining that the running router has no connection when a network interface is disconnected for a period of time.

46. The server of claim 41, wherein the determining further comprises:
   determining that the running router has no connection when no targets and logical units associated with the running router are connected.

47. The server of claim 41, wherein the determining further comprises:
   determining that the running router has a full connection when all targets and logical units associated with the running router are connected.

48. The server of claim 41, wherein the determining further comprises:
   determining that the running router has the partial connection when less than all targets and logical units associated with the running router are connected.

49. The server of claim 41, wherein the determining further comprises:
   determining that the running router has a full connection before the running router has discovered the device.

50. The server of claim 44, wherein sending the connectivity information includes:
   connecting the first server to the second server via a management connection and a high-availability connection; and
   transferring the connectivity information alternatively across the management connection and a high-availability connection.

51. The server of claim 41, wherein determining connectivity information includes establishing a high-availability process, wherein the high-availability process, when running, determines connectivity to its associated targets, LUNs and network connections.

52. The server of claim 41, wherein the ghost router and running router monitor connectivity to a set of resources, wherein the set of resources is the same set of resources for each router.

53. The server of claim 52, wherein the set of resources includes targets, LUNs (Logical Unit Numbers), and network connections.

54. The server of claim 41, wherein one of the routers is designated as primary; and
   wherein, if the primary router is the ghost router and the comparison determines that the ghost router has connectivity at least equal to the running router, then the running router will resign promoting the ghost router to the running router.

55. A method of transferring data between a host and a device, the method comprising:
   connecting a first server to the host across a network and to the device across a first channel fabric;
   connecting a second server to the host across the network and to the device across a second channel fabric;
   communicatively coupling the first server with the second server;
   establishing multiple instances of a router on each server;
   designating at least one of the routers on the first server as running and at least one of the routers on the second server as ghost;
   determining first connectivity information regarding connectivity across the first channel fabric between the device and the running router;
   receiving second connectivity information describing connectivity across the second channel fabric between the device and the ghost router;
   comparing at both the first and second server the first and second the first and second; and
   resigning the running router in favor of the ghost router when the comparison indicates that the ghost router has at least equal connectivity and the ghost router is primary, wherein resigning includes designating the router operating on the second server as running and the router operating on the first server as ghost.

56. The method of claim 55, wherein the determining further comprises:
  determining that the running router has a full connection when the first router has unsaved configuration changes.

57. The method of claim 55, wherein the determining further comprises:
  determining that the running router has a full connection when all targets and logical units associated with the running router are connected.

58. The method of claim 55, wherein the determining further comprises:
  determining that the running router has a full connection before the first router has discovered the device.

59. The method of claim 55, wherein sending the connectivity information includes:
  connecting the first server to the second server via a management connection and a high-availability connection; and
  transferring the connectivity information alternatively across the management connection and a high-availability connection.

60. The method of claim 55, wherein determining connectivity information includes establishing a high-availability process, wherein the high-availability process, when running, determines connectivity to its associated targets, LUNs and network connections.

61. The method of claim 55, wherein the ghost router and running router monitor connectivity to a set of resources, wherein the set of resources is the same set of resources for each router.

62. The method of claim 61, wherein the set of resources included targets, LUNs (Logical Unit Numbers), and network connections.

* * * * *

UNITED STATES PATENT AND TRADEMARK OFFICE
CERTIFICATE OF CORRECTION

PATENT NO. : 7,194,653 B1  
APPLICATION NO. : 10/287386  
DATED : March 20, 2007  
INVENTOR(S) : Hadders et al.

Page 1 of 1

It is certified that error appears in the above-identified patent and that said Letters Patent is hereby corrected as shown below:

In column 1, line 39, delete "is" and insert -- it --, therefor.

In column 2, line 50, delete "includes" and insert -- include --, therefor.

In column 4, line 2, delete "174" and insert --175 --, therefor.

In column 5, line 51, delete "is" and insert -- if --, therefor.

In column 8, line 33, delete "515" and insert -- 505 --, therefor.

In column 9, line 6, in Claim 1, after "designating" delete "the".

In column 14, line 15, in Claim 50, delete "claim 44" and insert -- claim 41 --, therefor.

In column 14, line 61, in Claim 55, delete "the first and second" and insert -- connectivity information --, therefor.

In column 16, line 16, in Claim 62, delete "included" and insert -- includes --, therefor.

Signed and Sealed this

Twenty-sixth Day of June, 2007

JON W. DUDAS  
*Director of the United States Patent and Trademark Office*